(12) United States Patent
Patton

(10) Patent No.: US 7,305,791 B2
(45) Date of Patent: Dec. 11, 2007

(54) FISHING WEIGHT FOR USE WITH METHOD FEEDER

(76) Inventor: Stuart Patton, 35 Harrow Lane, Maidenhead, Berkshire (GB) SL6 7PD ( * ) Notice: Subject to any disclaimer, the term of this patent is extended or adjusted under 35 U.S.C. 154(b) by 0 days.

(21) Appl. No.: 11/347,938

(22) Filed: Feb. 6, 2006

(65) Prior Publication Data
US 2007/0180758 A1    Aug. 9, 2007

(51) Int. Cl.
*A01K 97/02* (2006.01)
(52) U.S. Cl. ......................................... 43/4.5; 43/44.99
(58) Field of Classification Search ................ 43/44.99, 43/4.5
See application file for complete search history.

(56) References Cited

U.S. PATENT DOCUMENTS 2,713,744 A * 7/1955 Strausser, Sr. ............. 43/44.99

* cited by examiner

*Primary Examiner*—Kurt Rowan
(74) *Attorney, Agent, or Firm*—Raymond M. Galasso; Galasso & Associates, LP

(57) ABSTRACT

A fishing weight used in conjunction with a method feeding bag such as a PVA or mesh bag. The fishing weight comprises an elliptical shaped body having an essentially equal upper and lower hemispheres. Mounted to the lower hemisphere and extending outward therefrom is a post. The post further includes a ring for fastening a fishing line thereto distally located from said hemisphere. The upper hemisphere contains a bore axially located therein for receiving the post of the lower hemisphere upon connection of the lower and upper hemispheres.

6 Claims, 3 Drawing Sheets

FISHING WEIGHT FOR USE WITH METHOD FEEDER

FIELD OF THE INVENTION

The present invention relates to a fishing method and device, more specifically but not by way of limitation, a ledger weight and a method for using the ledger weight with a method feeder for fishing.

BACKGROUND

The number of participants involved in the sport of fishing is one of the highest for all sports in the world. Fishing is enjoyed by millions of individuals every year for recreational pleasure as well as professionally. Fishing occurs in a variety of geographical regions in a multitude of climates. From surf fishing in tropical regions to ice fishing in northern regions, there exist common equipment needs for individuals engaged in the sport.

Participants usually require at least a minimum of equipment such as an assortment of rods, reels, line, lures and other common fishing tools. Participants use this variety of tools and as many methods as possible to increase the probability of catching a fish. Method feeding is one popular technique that is used by fisherman for luring different types of fish. Method feeding is accomplished by using any device that attaches to the fishing line just above or below the hook that carries the hooked bait. Typically method feeders are mesh bags that have been packed with desired bait. The use of a method feeder places a small patch of bait adjacent to the hook and hooked bait in hopes that the extra bait will attract the desired species of fish.

Commonly a ledger weight or sinker is attached to the fishing line slightly above the hook and hooked bait and completely placed inside the feeding bag. Once the bait is cast the ledger weight keeps the hook and hooked bait positioned in the field of the bait contained in the bag.

One problem with existing fishing bag techniques is that casting is very difficult. As the ledger weight is completely disposed inside the feeding bag, casting distances usually results in torn bags as result of the shock from the force of an attempted strong cast in conjunction with the ledger weight being completely disposed inside the bag.

Another issue with current fishing bag techniques is accuracy and distance. As traditional fishing bag systems do not have the ledger weight on the very end of the fishing line, the ability to cast accurately is diminished as the weight provided by the ledger weight and bag are not at the optimum point. A ledger weight on the end of the line would also facilitate a smoother and longer cast, thereby reducing the chances of a broken bag.

Accordingly there is a need for a ledger weight that can be used with a fishing bag technique that can be secured to the end of the line so as to facilitate accuracy and distance when casting the bag feeder. Furthermore the positioning of the ledger weight at the end of the line would promote smoother casts thereby reducing the probability of breaking the fishing bag.

SUMMARY OF THE INVENTION

It is the object of the present invention to provide a ledger weight to be used with a method feeding technique that will facilitate longer and more accurate casts of the feeding bag.

It is a further object of the present invention to provide a ledger weight to be used with a polyvinyl alcohol (PVA) bag that will consist of generally two equal halves, one half of the ledger weight being disposed within the PVA bag and the other half being connected to the first half but being external of the PVA bag.

Another object of the present invention is to provide a ledger weight that is easy to use with a PVA bag method feeding system.

Yet another object of the present invention is to provide method of using the ledger weight with a PVA bag in order to facilitate longer and more accurate casts thereby promoting a better placement of the bag and bait contained therein in the desired position.

To the accomplishment of the above and related objects the present invention may be embodied in the form illustrated in the accompanying drawings. Attention is called to the fact that the drawings are illustrative only. Variations are contemplated as being part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
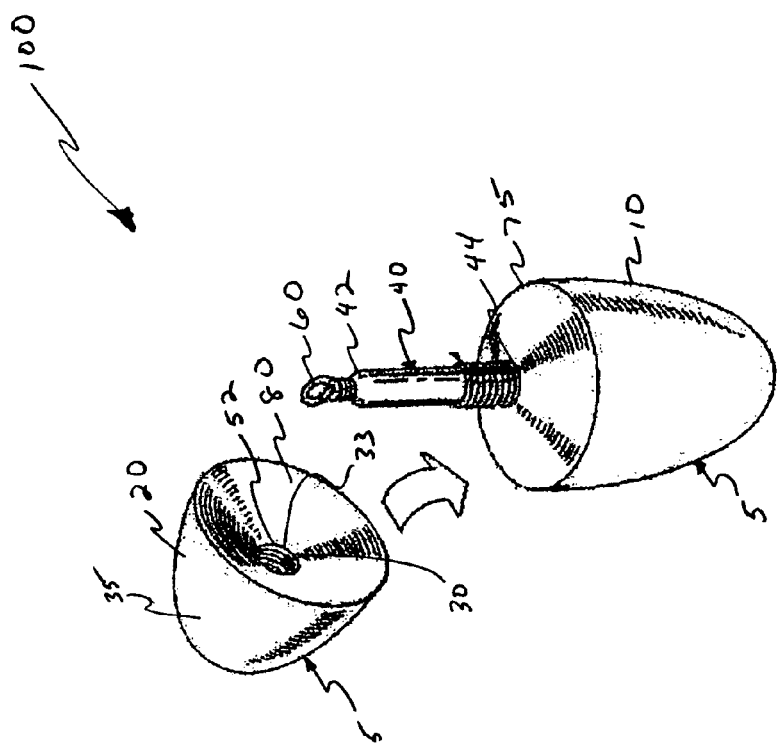
FIG. 1 is a perspective view of an embodiment of the present invention.
Figure 2:
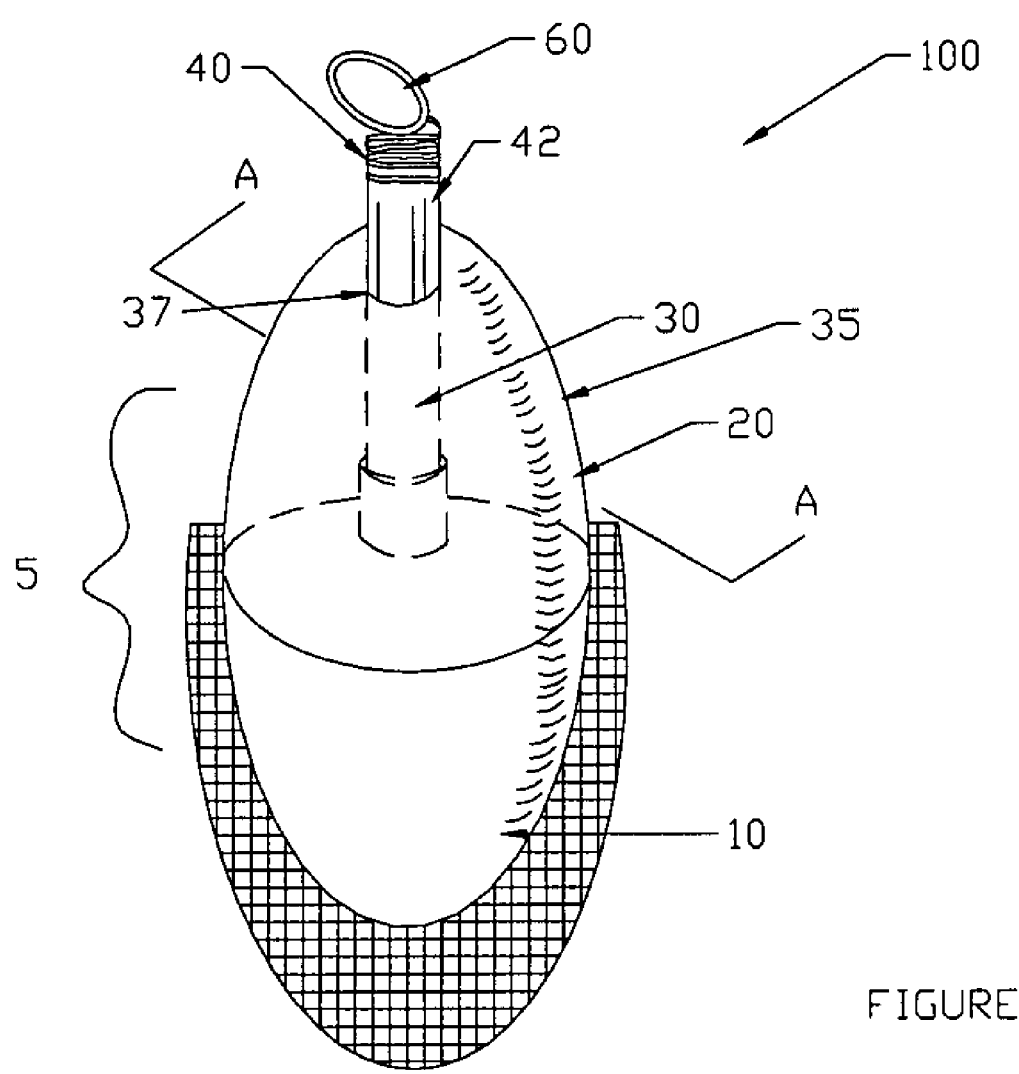
FIG. 2 is a perspective view of an embodiment of the present invention operably connected.

Referring now to the drawings wherein like elements are designated with identical reference numerals throughout the views and figures and wherein the various elements depicted are not necessarily drawn to scale, and in particular FIGS. 1 and 2, there is illustrated a ledger weight 100 constructed according to the principles of the present invention.

The ledger weight 100 comprises of a substantially elliptical shaped body 5. The body 5 is manufactured from a solid non-corrosive metal that is dense enough to sink in water such as but not by way of limitation lead or zinc alloy. Although the body 5 is illustrated in the drawings submitted herewith as being elliptical in shape, it is contemplated within the scope of the present invention that the body 5 could be numerous different shapes in place of and/or in conjunction with the shape described herein. More specifically but not by way of limitation, the body 5 could be tear shaped. Furthermore, although no specific dimensions of the body 5 are required, good results have been achieved with a body 5 that is 1.5 inches in length and 0.5 inches in width.

The body 5 includes two essentially equal hemispheres 10 and 20. Upper hemisphere 20 is configured to be superposed on the lower hemisphere 10. When joined the two hemispheres 10 and 20 connect proximate to the peripheral edge 75 of lower hemisphere 10. Inwardly extending from the peripheral edge 75 of the lower hemisphere 10 is the lower inner surface 70. The lower inner surface 70 is slightly convex in shape. The lower inner surface 70 is designed to be contiguous with the upper inner surface 80 of upper hemisphere 20 upon joining of the two hemispheres 15. The upper inner surface 80 is concave in shape in order to substantially engage with the lower inner surface 70. The convex shape of the lower inner surface 70 and the concave shape of the upper inner surface 80 functions to strengthen the connection between the two hemispheres 10 and 20 upon engagement. Those skilled in the art will recognize that the lower inner surface 70 and the upper inner surface 80 could be configured with numerous mating shapes in place of and/or in conjunction with the shapes described herein and achieved the desired functionality as suggested herein.

Concentrically mounted to the lower hemisphere 10 contiguous with the lower inner surface 70 and extending upwardly therefrom is a post 40. The post 40 is secured to the lower hemisphere 10 by conventional methods such as but not limited to soldering or welding. It is further contemplated that the post 40 and the lower hemisphere 10 could be cast manufactured as one assembly. The post 40 is manufactured from a suitable non-corrosive durable metal such as lead or zinc alloy. The post 40 has a second end 44 that is contiguous with the lower inner surface 70 and mounted thereto. Externally disposed on the second end 44 of the post 40 proximate to the lower inner surface 70 are outer threads 50. The outer threads 50 are disposed externally on the post 40 on a portion thereof and are designed to releasably secure the lower hemisphere 10 with the upper hemisphere 20.

As shown in particular in FIG. 2, the first end 42 of the post 40 extends beyond the outer surface 35 of the upper hemisphere 20 when the lower hemisphere 10 and the upper hemisphere 20 are connected. This allows the user to fasten a fishing line to the ring 60 that is secured to the first end 42 of the post 40.

Referring in particular to FIG. 1, contiguous with the first end 42 of the post 40 and extending therefrom is a ring 60. The ring 60 is an annular shaped metal ring that is designed to accommodate fishing line. The ring 60 is manufactured from non-corrosive metal such as but not limited to lead or zinc alloy. The ring 60 is secured to the first end 42 of the post 40 by conventional methods such as welding or soldering. Although no specific diameter of the ring 60 is required, it is contemplated within the scope of the present invention that the ring 60 have a diameter that is no greater than the width of the bore 30 so as to allow the ring 60 and the post 40 to be journaled therein and pass through without restriction. It is further contemplated within the scope of the present invention that the ring 60 could be swivel mounted to the first end 42 of the post 40 in order to prevent line twist when in use. The lower hemisphere 10 is releasably secured to the upper hemisphere 20 by aligning the upper hemisphere 10 axially with the lower hemisphere 10 thereby allowing the post 40 to be journaled through the bore 30 that is concentrically located in the upper hemisphere 20. The bore 30 is a cylindrical cavity that is of sufficient diameter to accommodate the post 40. The bore 30 has a first opening 33 and a second opening 37 which facilitates complete passage of the post 40 therethrough upon engagement of the two hemispheres 15. The first opening 33 is proximate to the upper inner surface 80. Disposed internally on a portion of the bore 30 proximate to the first opening 33 are inner threads 52. These inner threads 52 connect with the outer threads 50 on the post 40 and allow the two hemispheres to be releasably secured. Although no specific type of threads is required, good results have been achieved using coarse threads to promote sufficient joining of the two hemispheres 10 and 20 upon placement of the lower hemisphere 10 into the method feeder.

Referring now in particular to FIG. 2, the post 40 axially extends beyond the outer surface 35 through the second opening 37 of the bore 30 of the upper hemisphere 20 when the two hemispheres 10 and 20 are releasably secured to each other by screwing together using the outer threads 50 and inner threads 52. This allows a user to fasten to the ring 60 a fishing line of desired material by conventional methods such as but not limited to a knot. The ledger weight 100 is designed to be used with a conventional fishing bag such as a mesh or PVA bag. PVA bags are made from polyvinyl alcohol which is a water soluble synthetic polymer made by alcoholysis of polyvinyl acetate. The properties of the PVA bag depend on the degree of polymerization and the percentage of alcoholysis. The water solubility will increase as molecular weight decreases. These bags are commonly referred to as method feeders. Conventional method feeders dissolve after a short period of time once the bag has been submersed in water.

Figure 3:
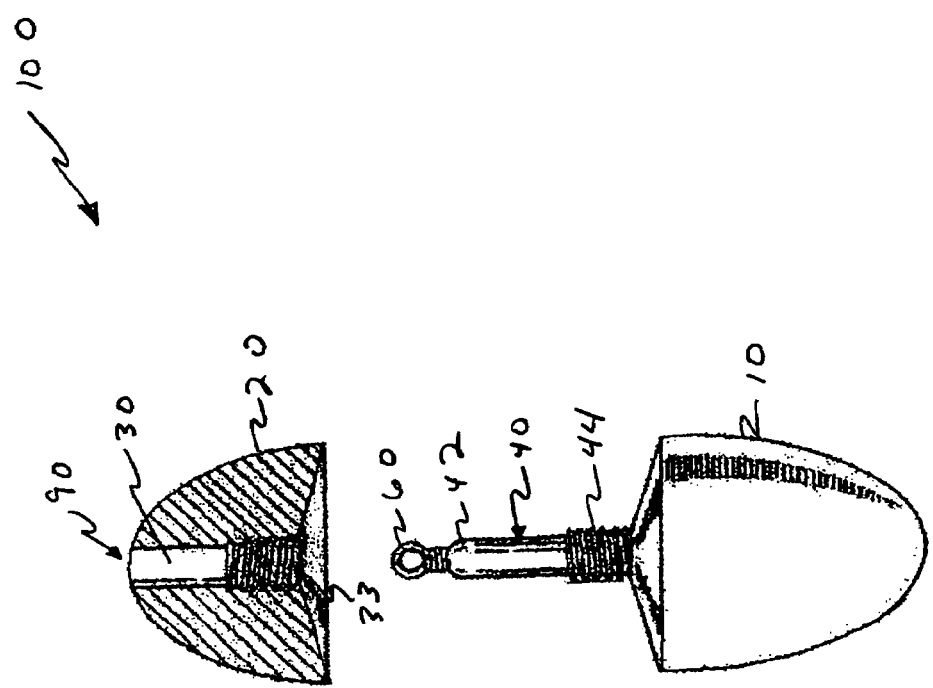
FIG. 3 is an exploded side view with a portion illustrated in sectional view taken along A-A of FIG. 2.

Referring in particular to FIG. 3, the ledger weight 100 is illustrated with a lateral cross-sectional view of the upper hemisphere 20. Axially located in the upper hemisphere 20 is a bore 30. The bore 30 penetrates completely through the upper hemisphere 20. The post 40 passes through the bore 30 and has a first end 42 that extends above the second opening 90 thereby allowing the ring 60 to be accessible for fastening a fishing line thereto when the lower hemisphere 10 and the upper hemisphere 20 are joined.

Referring in particular to FIGS. 1 and 2 submitted herewith, a description of the operation of the ledger weight 100 is as follows. An individual will fill a method feeding bag such as a PVA bag with a desired fish food or bait such as but not limited to trout pellets.

Subsequent to filling the bag with the desired fish food or bait, the user will place the lower hemisphere 10 in the bag with the bait and adjacent to the opening of the bag. The user then secures one end of a fishing line from a rod and reel to the ring 60 and extends a segment of line therefrom and fastens a fishing hook to the portion of the line extending past the ring 60 using conventional methods such as a knot. Placed thereon the hook is an additional piece of desired bait, which is subsequently hooked to the method feeding bag with the secondary bait or placed inside of the bag.

The user then closes the opening of the bag whereby the bag is secured to a portion of the post 40 using conventional means such as but not limited to PVA tape or PVA string. The portion of the bag adjacent to the opening is adjacent to the upper inner surface 70. In this configuration, the bag is completely closed with the lower hemisphere 10 of the ledger weight 100 being adjacent to the opening of the bag and the post 40 extending above the location where the bag has been secured thereto. The user then secures the upper hemisphere 20 to the lower hemisphere 10 by inserting the post 40 through the bore 30 and using the outer threads 50 and inner threads 52 to releasably secure the lower hemisphere 10 to the upper hemisphere 20.

Upon engagement of the two hemispheres 10 and 20 the bag is secured into position along the peripheral edge 75 and extends downward therefrom whereby the portion of the feeding bag adjacent to the opening is interposed the upper and lower hemisphere. The user then casts the ledger weight 100 with the attached method feeder to the desired location. This process is repeated as the bait needs replenishment after a fish has been caught or the bait in the method feeder has been depleted.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for using a fishing weight having an upper and lower joinable hemispheres, said fishing weight having a lower hemisphere having a post outwardly extending therefrom and further having a ring superposed on said post distal to said hemisphere, comprising:

selecting a desired style of method feeding bag to hold fish bait;

filling the method feeding bag with the desired bait to a select level;

placing the lower hemisphere of the fishing weight in the method feeding bag adjacent to the opening of the method feeding bag;

closing the open end of the method feeding bag with said lower hemisphere contained and with a portion of the post of the lower hemisphere external the method feeding bag;

securing the opening of the method bag to the post; and connecting the upper hemisphere with the lower hemisphere.

2. The method of claim 1 and further comprising the steps of fastening an end of a fishing line to said ring;

extending a segment of said fishing line beyond said ring for attachment to a fishing hook; and casting said fishing weight with said method bag into the water.

3. The method of claim 2 and further including the step of securing bait to said fishing hook.

4. The method as recited in claim 1, comprising the step of selecting a PVA fishing bag.

5. The method as recited in claim 1, comprising the step of selecting a mesh fishing bag.

6. The method as recited in claim 1, wherein PVA tape is used to secure said bag to said post.

* * * * *